United States Patent [19]

Davies et al.

[11] 4,225,593

[45] Sep. 30, 1980

[54] GROWTH PROMOTION

[75] Inventors: David H. Davies, Macclesfield; Geoffrey L. F. Norris, Sandbach, both of England

[73] Assignee: Imperial Chemical Industries Limited, London, England

[21] Appl. No.: 967,796

[22] Filed: Dec. 4, 1978

[30] Foreign Application Priority Data

Dec. 22, 1977 [GB] United Kingdom ............... 53448/77
May 8, 1978 [GB] United Kingdom ............... 18269/78

[51] Int. Cl.$^2$ ............................................. A61K 31/69
[52] U.S. Cl. ............................... 424/185; 260/345.8 R
[58] Field of Search ................... 260/345.8 R; 424/185

[56] References Cited

U.S. PATENT DOCUMENTS 3,864,479  2/1975  Miller et al. ........................ 424/185

FOREIGN PATENT DOCUMENTS 1116280  6/1968  United Kingdom .

OTHER PUBLICATIONS

Okami et al., "J. of Antibiotics", vol. XXIX, (1976), pp. 1019–1025.
Kitahata, "J. of Antibiotics", vol. XXX, (1977), pp. 714–719.
Hutter et al., "Helvetica Chimica Acta", vol. 50, (1967), pp. 1533–1539.
Dunitz et al., "Helvetica Chimica Acta", vol. 54, (1971), pp. 1709–1713.

*Primary Examiner*—Frederick E. Waddell
*Attorney, Agent, or Firm*—Cushman, Darby & Cushman

[57] ABSTRACT

This invention relates to the use of aplasmomycin, boromycin and acylated and hydrogenated derivatives thereof for modifying rumen metabolism in domestic ruminant animals, by reducing the proportion of methane formed, and increasing the proportion of propionate at the expense of methane and/or acetate. This modification of rumen metabolism is believed to improve growth in ruminant animals. The disclosure also describes compositions which may be used in the claimed method, an improved process for the production of aplasmomycin, and novel analogs of aplasmomycin and boromycin together with processes for their manufacture.

6 Claims, No Drawings

GROWTH PROMOTION

This invention relates to methods, compositions and novel chemical compounds for use in the husbandry of domesticated ruminant animals, for example cattle, sheep, goats and deer, to reduce the proportion of methane produced by ruminal fermentation, and to increase the proportion of propionic acid in rumen fluid, and thereby to improve their rate of growth or the efficiency of their food conversion, or both.

In ruminant animals, a significant proportion of the gross energy intake in the form of food is lost in the form of methane, which is formed during the fermentation of the food in the rumen, and a further significant proportion of the gross energy intake is lost as heat of fermentation. For example, in lambs methane production can account for about 10% of the gross energy intake, and heat of fermentation accounts for about a further 6%. The compositions and compounds of the invention have the effect of increasing the proportion of propionic acid in rumen fluid, and in particular they have the effect of increasing the proportion of propionic acid at the expense of methane and/or acetic acid. This is known to be a desirable effect in ruminant nutrition, because propionic acid is a much more efficient precursor of glucose, from which the animal derives its energy and growth, than is acetic acid; while that part of the animal's food intake which is converted to methane is simply lost to the animal, the methane being excreted by eructation. Thus, the modification of rumen metabolism achieved by the compositions and compounds of the invention is a most useful effect, and is believed to increase the rate of growth and the food conversion efficiency of ruminant animals.

Thus, according to the invention, there is provided a method for use in the husbandry of domesticated ruminant animals, which comprises orally administering to such animals a compound of the formula:

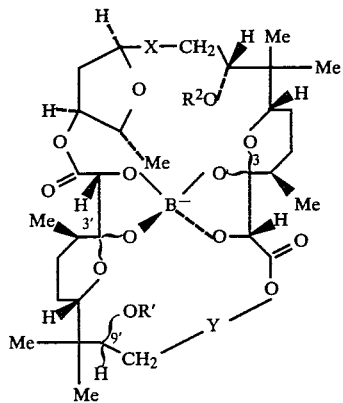

wherein

R$^1$ and R$^2$ are each a hydrogen atom or an acetyl radical, and either carbon atoms 3, 3' and 9' are in the R-configuration, X is an ethylene or trans-vinylene radical and Y is a radical Y$^1$ of the formula:

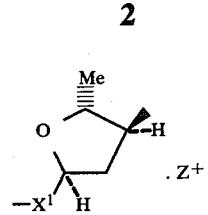

in which X$^1$ is bonded to the CH$_2$ group and the ring carbon atom is bonded to the oxygen atom, and in which X$^1$ is an ethylene or trans-vinylene radical, and Z$^+$ is a sodium, potassium, lithium, caesium or ammonium ion, or an ion of the formula R$^3$R$^4$R$^5$R$^6$N$^+$ in which each of R$^3$, R$^4$, R$^5$ and R$^6$ is hydrogen or 1-6C alkyl;

or carbon atoms, 3, 3' and 9' are all in the S-configuration, X is an ethylene radical and Y is a radical Y$^2$ of the formula:

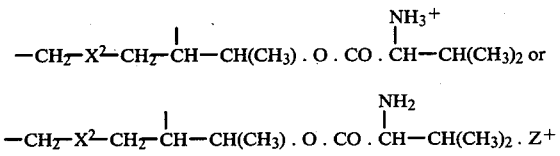

in which the CH$_2$ is bonded to the CH$_2$ group shown in formula I, and the CH group is bonded to the oxygen atom, and in which X$^2$ is an ethylene or cis-vinylene radical:

or carbon atoms 3, 3' and 9' are all in the S-configuration, X is an ethylene radical and Y is a radical Y$^3$ of the formula:

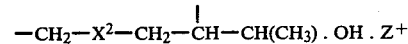

wherein X$^2$ and Z$^+$ have the meanings stated above.

Particular compounds of the formula I which may be used in the method of the invention are:

1. aplasmomycin (3R, 3'R, 9'R, R$^1$=R$^2$=H, X=trans-vinylene, Y=Y$^1$ in which X is trans-vinylene and Z is sodium). This is a metabolite isolated from the fermentation of *Streptomyces griseus* strain SS-20, as described by Okami et al., The Journal of Antibiotics, 1976, volume XXIX, pages 1019 to 1025, and Kitahara, ibid, 1977, volume XXX, pages 714 to 719. This strain is deposited at the Fermentation Research Institute, Chiba, Japan under the reference number FERM-P No. 3448;

2. ICI.122,378, a metabolite isolated from the fermentation of *S.griseus*, strain deposited at the National Collection of Bacteria, Ministry of Agriculture, Fisheries and Food, Torry Research Station, 135 Abbey Road, Aberdeen AB9 8DG, Scotland, under the reference number NCIB 11371. This material is identical with aplasmomycin;

3. boromycin (3S, 3'S, 9'S, R$^1$=R$^2$=H, X=ethylene, Y=Y$^2$ in which X$^2$ is cis-vinylene). This is a metabolite isolated from the fermentation of *S.antibioticus* (Waksman and Woodruff) strain ETH 28829, as described by Hutter et al., Helvetica Chimica Acta, 1967, volume 50, pages 1533 to 1539, and Dunitz et al., ibid, 1971, volume 54, pages 1709 to 1713. This strain is also deposited at the United States Department of Agriculture, Peoria, Ill., U.S.A., under the reference number NRRL 3207;

4. Factor B, a compound of molecular formula $C_{42}H_{62}BNaO_{15}$ which is a co-metabolite of aplasmomycin in the fermentation of *S.griseus*, NCIB 11371, and is a monoacetyl derivative thereof, in which the relative stereo chemistry may or may not be the same as in aplasmomycin;

5. Factor C, a compound of the molecular formula $C_{44}H_{64}BNaO_{16}$ which is a co-metabolite of aplasmomycin in the fermentation of *S.griseus*, NCIB 11371, and is a diacetyl derivative thereof, in which the relative stereochemistry may or may not be the same as in aplasmomycin.

In the method of the invention, the compound of the formula I is preferably orally administered to animals as a supplement to their normal diet, that is to say, in admixture with an ordinary solid foodstuff, in feedblocks or salt licks, dissolved or suspended in the drinking water or, for young animals such as lambs or calves, dissolved or suspended in whole milk or skim milk. The compound of the formula I is incorporated into food, feedblocks, salt-licks, drinking water, whole milk or skim milk to such an extent that each treated animal will ingest from 0.01 mg./kg. body weight to 30 mg./kg. body weight per day, preferably from 0.01 mg./kg. to 10 mg./kg. per day, of the compound of the formula I.

The compound of the formula I may alternatively be orally administered to animals in the form of a slow-release, intra-ruminal pellet or bolus, such that the animal will absorb a similar quantity per day of the compound of the formula I.

The animals may receive a compound of the formula I for substantially the whole of their growing period, or for only a part of their growing period, for example the early part and/or the period leading up to slaughter. The increase in growth rate achieved by practising the method of the invention enables animals reared for meat to be brought to market weight or slaughter weight in a shorter growing period than normal, or it enables heavier animals to be produced at the end of the normal growing period. The improved efficiency of food conversion achieved by practising the method of the invention enables treated animals to reach any desired weight while consuming less food than untreated animals grown to the same weight. At optimum growth promoting inclusion levels, no indication of any toxic effect due to the compound of the formula I is observed.

According to a further feature of the invention, there is provided a non-toxic ingestable composition which comprises a compound of the formula I wherein:

carbon atoms 3, 3' and 9' are all in the R-configuration, X is an ethylene or trans-vinylene radical and Y is a radical $Y^1$ as defined above; or carbon atoms 3, 3' and 9' are all in the S-configuration, X is an ethylene radical and Y is a radical $Y^2$ as defined above in which $X^2$ is an ethylene radical; or carbon atoms 3, 3' and 9' are all in the S-configuration, X is an ethylene radical and Y is a radical $Y^3$ as defined above; together with a solid or liquid, non-toxic, ingestable diluent or carrier.

A suitable liquid diluent or carrier is, for example, drinking water, whole milk or skim milk.

A suitable solid, non-toxic ingestable diluent or carrier may be for example, a conventional nutritionally balanced ruminant feedstuff, for example a typical cattle or sheep diet consisting of cereal products, such as barley meal, maize meal or wheat feed, nut and seed products, such as decorticated grund nut cake or cotton seed cake, or extracted cotton seed cake, together with minor amounts of, for example, feather meal, seaweed meal, bone meal, bone flour, chalk, salt, urea, molasses, vitamins and trace minerals; or it may be an inert solid diluent or carrier of no nutritional value, for example kaolin, talc, calcium carbonate, fuller's earth, attapulgus clay, ground oyster shells or ground limestone; or it may be starch or lactose.

The composition of the invention may take the form of a supplemented feedstuff for direct feeding to animals, in which case it will contain from 5 ppm to 3000 ppm of a compound of the formula I in admixture with a conventional ruminant feedstuff; or it may take the form of a concentrated premix for dilution with a conventional ruminant feedstuff to produce a supplemented feedstuff suitable for direct feeding to animals, and such a premix will contain from 0.3% w/w to 50% w/w of a compound of the formula I in admixture with either a conventional, nutritionally balanced ruminant feedstuff, an inert solid diluent of no nutritional value, for example ground limestone, or starch or lactose.

According to a further feature of the invention there is provided a process for the manufacture of a solid composition of the invention which comprises uniformly mixing a compound of the formula I with a solid, non-toxic ingestable diluent or carrier.

The compound of the formula I is preferably serially diluted with a diluent or carrier in two or more successive stages, to ensure evening mixing.

According to a further feature of the invention there is provided a process for the manufacture of a compound of the formula I wherein $R^1$ and $R^2$ are each a hydrogen atom or an acetyl radical, X is trans-vinylene and Y is a radical $Y^1$ in which $X^1$ is trans-vinylene and $Z^+$ is a sodium ion, which comprises culturing an aplasmomycin-producing strain or mutant of *Streptomyces griseus* in an aqueous nutrient medium, containing sources of assimilable carbon, nitrogen and boron and a sodium salt, under aerobic conditions at a temperature between 10° and 37° C., filtering the culture, and isolating the product from the filtrate by conventional means.

In the process of the invention, a suitable source of assimilable carbon is, for example, a polyhydric alcohol, for example glycerol, glucose, xylose, arabinose, rhamnose, fructose, galactose, mannitol or inositol, and a preferred carbon source is glucose syrup, which is conveniently incorporated into the medium at a rate of 1% to 5% w/v.

A suitable source of assimilable nitrogen is, for example, peptone, which is conveniently incorporated at a rate of 0.05% to 2% w/v.

The nutrient medium may additionally contain smaller quantities of other elements, such as phosphorus, in the form of, for example, potassium dihydrogen orthophosphate or diammonium hydrogen phosphate; magnesium, in the form of, for example, magnesium sulphate or magnesium carbonate; sulphur, in the form of, for example, a sulphate salt, potassium in the form of, for example potassium chloride, potassium carbonate or potassium dihydrogen orthophosphate; and trace quantities of salts of such elements as copper, zinc, iron, manganese and molybdenum.

A suitable temperature for the fermentation is 28° C., and the product may be isolated from the culture filtrate by conventional means, for example by extracting the filtrate with a water-immiscible organic solvent without adjusting the pH, followed by evaporation of the solvent and chromatography of the residue.

According to a further feature of the invention, there is provided *Streptomyces griseus*, deposited with the National Collection of Industrial Bacteria and assigned the number NCIB 11371, and variants and mutants thereof. This organism is suitable for use in the above process, and has the following description:

[The media used are made up in accordance with the recipes for the 'International Streptomyces Project (ISP)' and are as described by Shirling, E. B. & Gottlieb, D (1966) in 'Methods for characterisation of Streptomyces species' in *International Journal of Systematic Bacteriology*, 16, (3), 313-340.] Conditions of incubation—

Temperature 30° C.
Dark grown.

ISP2 Yeast extract/Malt extract 4 days 3-4 mm.—Good raised, crinkled, 'glassy colonies'. Dark fawn. Reverse—brown grey.

10 days 10 mm. Submerged growth at edge with raised, wrinkled, watery fawn/grey colonies. Reverse unchanged. No colour in agar.

ISP3 Oatmeal agar 4 days—1-2 mm. Thin, watery, sometimes with a cavity torn in the centre. Reverse very pale brown/grey.

10 days 4-6 mm. Waxy-yeasty, smooth grey-fawn colonies. Reverse unchanged. Very faint brown colour imparted to the agar.

ISP4 Inorganic salts—starch agar 4 days 1-2 mm. Fair, wet, tightly compact colonies. Pale fawn. Reverse pale fawn/grey.

10 days Little further growth. Not waxy, slightly raised, wrinkled with uneven edges. Pale fawn. Reverse unchanged. No colour to the agar.

ISP5 Glycerol-asparagine agar 4 days 1-2 mm raised colonies. Wrinkled and depressing the agar at the colony margin. Glassy fawn. Reverse pale fawn-grey.

10 days 3-5 mm. Waxy, raised and wrinkled. Yellowish-fawn. Reverse unchanged.

ISP7 Tyrosine agar 4 days 2-3 mm. Good raised, wrinkled, glassy fawn colonies. Reverse grey-brown. Medium turned faint brown.

10 days 10 mm. Waxy, wrinkled, yellowish/dark fawn-grey with some powdery grey areas. Reverse dark grey-brown, but colouration of the agar detectable.

ISP9 Carbon utilisation agar

| Addition | 4 days | 10 days | Score |
|---|---|---|---|
| Water | 1-2mm. Submerged very thin, 'smokey' | very thin, 'smokey', submerged | — |
| Glucose | 1-2mm. Fair, rather 'jellyfish'-like. Fawn grey | 2-3mm. Tight, raised waxy, fawn grey. Reverse unchanged. | ++ |
| Arabinose | Slightly better than water. | As water. | — |
| Cellulose | Indeterminable. | As water. | — |
| Fructose | 1mm. Tight, raised, 'glassy' colonies, fawn grey. Reverse fawn-grey. | 4-5mm. Tight, raised, waxy, wrinkled, cracked, fawn grey. | ++ |
| Inositol | As arabinose | Slightly better than water. | + |
| Mannitol | 2mm. Tight, raised, glassy, fawn colonies, with torn centres. Reverse fawn. | 2-3mm. Tight, raised, waxy, fawn. Reverse fawn. | |
| Raffinose | As arabinose | As water | — |
| Rhamnose | As water | As water | — |
| Sucrose | As water | As water | — |
| Xylose | 1-2mm. Very thin, short, velvety fawn. | 2-3mm. Slightly raised, velvety, light fawn grey, possibly sporing. | ++ |

Temperature tolerance

On Tryptone-yeast broth (ISP1). Lowest temperature tested 19° C. grows fairly well. Best around 28° C. and does not tolerate temperatures greater than 37° C.

Morphology

This is a poor-sporing strain, but the spores, when seen, are in short chains, smooth walled and barrel-shaped.

According to a further feature of the invention, there is provided a novel compound of the formula I wherein $R^1$ and $R^2$ are each a hydrogen atom or an acetyl radical, and:

(a) carbon atoms 3, 3' and 9' are all in the R-configuration, Y is a radical $Y^1$, either one of X and $X^1$ is an ethylene radical and the other is a trans-vinylene radical, or both X and $X^1$ are ethylene radicals, and $Z^+$ has the meaning stated above; or (b) carbon atoms 3, 3' and 9' are all in the R-configuration, X is a trans-vinylene radical, and Y is a radical $Y^1$ in which $X^1$ is a trans-vinylene radical and $Z^+$ is a potassium, lithium, caesium or ammonium ion, or an ion of the formula $R^3R^4R^5R^6N^+$ as defined above; or (c) carbon atoms 3, 3' and 9' are all in the S-configuration, X is an ethylene radical and Y is a radical $Y^2$ in which $X^2$ is an ethylene radical; or (d) carbon atoms 3, 3' and 9' are all in the S-configuration, X is an ethylene radical and Y is a radical $Y^3$ in which $X^2$ has the meaning stated above and $A^+$ is a potassium, lithium, caesium or ammonium ion, or an ion of the formula $R^3R^4R^5R^6N^+$ as defined above.

According to a further feature of the invention there is provided a process for the manufacture of a novel compound of the formula I which comprises:

(i) for the novel compounds defined in (a) above, the selective or non-selective hydrogenation of a corresponding compound of formula I wherein X and $X^1$ are each a trans-vinylene radical, over a platinum or palladium catalyst; or (ii) for the novel compounds defined in (b) above, the fermentation of an aplasmomycin-producing or ICI 122,378-producing strain of *S.griseus*, as defined above, in the presence of a potassium, lithium, caesium, ammonium or $R^3R^4R^5R^6N^+$ salt in the aqueous nutrient medium; or (iii) for the novel compounds defined in (c) above, the hydrogenation over a platinum or palladium catalyst of a corresponding compound of the formula I wherein X is an ethylene radical and Y is a radical $Y^2$ in which $X^2$ is a cis-vinylene radical; or (iv) for the novel compounds defined in (d) above, the reaction of a compound of the formula I wherein X is an ethylene radical and Y is a radical $Y^2$ with potassium, lithium or caesium hydroxide, or potassium, lithium or caesium carbonate.

It is to be understood, of course, that a compound of the formula I wherein $Z^+$ has one meaning may be converted to a similar compound wherein $Z^+$ has a different meaning, by conventional methods, for example by using ion-exchange resins.

Aplasmomycin and Factors B and C also show anticoccidial activity. This activity is demonstrated by their action in preventing coccidial growth in cultures of chick kidney cells inoculated with sporozites in accord with the standard test described in *Journal of Parasitology*, 58, 664–668 (1972). In this test, aplasmomycin shows activity against *Eimeria tenella* at a concentration of 0.037 ppm but only shows toxic effects on the host cells at a concentration of 9 ppm. Similarly, a mixture of Factors B and C shows activity against *E.tenella* at a concentration of 0.012 ppm but only shows toxic effects on the host cells at a concentration of 1 ppm.

The invention is illustrated but not limited by the following Examples:

EXAMPLE 1

*Streptomyces griseus* NCIB 11371 was grown as a slope culture on dextrin-agar (45 ml.) for 7 days at 30° C. The slope was scraped into 100 ml. of sterile water, and the suspension so obtained was used to inoculate three 500 ml. flasks each containing 50 ml. of the following medium:

| | |
|---|---|
| Soya bean meal | 1.5% w/v |
| "Difco Bacto Casitone" (trademark) | 0.1% w/v |
| Sodium nitrate | 0.3% w/v |
| Glucose syrup | 2.0% w/v |
| Calcium carbonate | 0.25% w/v |
| Deionised water | to 100 | which had been pre-sterilised by autoclaving at 15 p.p.s.i. for ½ hour, the pH being approximately 7.0.

The three flasks thus prepared were shaken at 27° C. for 75 hours on a rotary shaker. The contents of the three flasks were then combined, and used to inoculate a stainless steel fermenter containing 30 l. of sterilised medium of the same composition as described above. The fermenter contents were stirred at 27° C. for 88 hours, using a turbine with 4 flat blades rotating at 350 r.p.m., and aerated at a rate of 7.5 l. per minute. The resulting broth was filtered through diatomaceous earth, and the filter bed was washed with water (3 l.). The filtrate and washings were combined (28 l.) and extracted at their natural pH with ethyl acetate 1×9 l. and 1×7 l.). The ethyl acetate extracts were combined, dried with sodium sulphate and filtered, and the filtrate was concentrated under reduced pressure to yield an oily residue (29 g.).

The required product may be obtained from the above concentrate by either of two procedures, as follows:

(A) The oily residue (29 g.) was dissolved in the minimum volume of a solvent mixture of the following composition: chloroform (98 parts) methanol (1 part) formic acid (1 part), and the solution was applied to the top of the column of silica gel (90 cm×5½ cm.) made up as a slurry with the same solvent mixture. The column was eluted with the same solvent mixture and 500 ml. fractions were collected after the solvent front had emerged from the column. Fractions 4 and 5 were combined and the solvent was evaporated to give a gum (3.5 g.) which was further purified by preparative layer chromatography on silica (Merck's "Kieselgel 60 F250"—trade mark—2 mm. thick) using 30% v/v ethyl acetate in petroleum ether (b.p. 60°–80° C.) as the eluent mixture. The band at $R_F=0.25$ (approximately) was scraped from the plate and extracted with ethyl acetate, and the solvent was evaporated to give a white crystalline solid (140 mg.), which was crystallised from aqueous methanol and dried under vacuum for 5 hours to give ICI 122,378, no definite melting point, $[\alpha]_D^{23} = +210°$ (C=0.5 in chloroform). Analysis: Found C=60.1, H=7.7, Na=2.8. Calculated for $C_{40}H_{60}BNaO_{14}$, C=60.2, H=7.5, Na=2.9%. Mass spectrum: $M^+ = 798.396$, calculated for $C_{40}H_{60}BNaO_{14}=798.396$. $R_F=0.74$ (thin layer chromatography on Merck's 60F-254 0.25 mm. plates developed with 10% v/v methanol in chloroform, visualised as a brown spot after spraying with 3 N sulphuric acid and heating at 100° C., or as a red-pink spot after spraying with a solution of carminic acid in 3 N sulphuric acid and heating to 70° C. for 5 minutes).

(B) The oily residue (60 g.), from the ethylacetate extract obtained from a similar 80 l. fermentation, was dissolved in methanol (400 ml.) and the solution was shaken with petroleum ether (b.p. 60°–80° C. 800 ml.). The bottom phase (methanol layer) was separated and concentrated under reduced pressure to yield a gum (24 g.) which was dissolved in the minimum volume of a mixture of ethyl acetate (35 parts) and petroleum ether (b.p. 60°–80° C., 65 parts) and applied to the top of a silica gel column (51×4½ cm.; 450 g.) made up as a slurry with the same solvent mixture. 25 Ml. fractions were collected after the solvent front had emerged from the column, fractions 25–70 were combined, and the solvent was evaporated to give a viscous gum (3.3 g.). This gum was further purified by preparative layer chromatography on silica (as described in A above) to yield pure ICI 122,378 (300 mg.) identical with the material obtained by process A above.

EXAMPLE 2

The ability of ICI 122,378 to inhibit the production of methane in the rumen of ruminant animals, and to increase the proportion of propionate (Ac/Pr) and butyrate (Ac/Bu) at the expense of acetate in the volatile fatty acids (VFA) produced, without at the same time depressing the overall digestive process, is demonstrated as follows:

Rumen fluid is collected on a regular routine basis from two steers, which are fed on the same hay-plus-concentrate diet. Sampling time is standarised as far as possible, and the fluid from the two animals is pooled on a 50/50 basis. Large particulate matter is removed by filtering the pooled fluid through four layers of muslin cloth. The filtrate is then diluted in the ratio of one volume of filtrate to three volumes of an artificial rumen fluid (prepared as described by G. L. Bales et al., Journal of Diary Science, 1976, volume 59, page 1850, but omitting acetic acid), and the pH of the mixture is adjusted to 6.9–7.0 with saturated aqueous sodium carbonate solution. Aliquots (50 ml.) of this mixture are dispensed into 100 ml. conical flasks containing dried ground hay (0.5 g.), and each flask is used to test a test compound at a particular concentration.

The test compound is added to the conical flask as a solution in ethanol, the flask is flushed with carbon dioxide gas, stoppered with a suba-seal, and incubated at 39° C. for 15-16 hours. After one hour, a narrow bore needle is inserted through the suba-seal to relieve the gas pressure, and the needle is withdrawn 30 minutes before the incubation is ended. Fermentation is then stopped by placing the flask in ice, and after 15 minutes cooling, the gas over the liquid is analysed for methane by gas chromatrography. The flask contents are then filtered through a previously dried and weighed sintered glass funnel, the funnel is oven-dried and, by difference, the weight of hay digested is determined. (Blank flasks containing no hay are treated similarly to determine non-cellulose residue). Three samples of the filtrate are analysed by gas chromatography for VFAs, and by comparison with the previously determined, pre-incubation level of VFAs, the net VFAs (acetate, propionate and butyrate) produced during the incubation is determined.

The following results were obtained (monensin, a known growth promoter acting by an effect on the rumen is included as a positive control, together with a negative control in which no test compound is employed):

|  | % methane in total gas | Ac/Pr | Ac/Bu |
| --- | --- | --- | --- |
| Control | 8.37 | 1.90 | 3.92 |
| ICI 122,378: | | | |
| 3μg./ml. | 2.58 | 1.34 | 3.52 |
| 1μg./ml. | 3.81 | 1.26 | 4.26 |
| 0.5μg./ml. | 4.87 | 1.29 | 4.56 |
| 0.3μg./ml. | 5.72 | 1.36 | 4.75 |
| 0.1μg./ml. | 7.87 | 1.63 | 4.22 |
| Monensin | | | |
| 3μg./ml. | 4.53 | 1.54 | 3.39 |
| 1μg./ml. | 5.62 | 1.51 | 3.21 |
| 0.5μg./ml. | 6.75 | 1.61 | 4.03 |
| 0.3μg./ml. | 7.53 | 1.65 | 4.11 |
| 0.1μg./ml. | 8.35 | 1.80 | 4.22 |

EXAMPLE 3

The fermentation described in Example 1 was repeated, the resulting broth was filtered through diatomaceous earth, and the filter-bed was washed with water (3 l.). The filtrate and washings were combined, and extracted at their natural pH with ethyl acetate (1×9 l. and 1×7 l.). The ethyl acetate extracts were combined, dried with sodium sulphate and filtered, and the filtrate was concentrated under reduced pressure to yield an oily residue (8.2 g.). The damp mycelium was homogenised in methanol and, after filtering, the wet methanolic solution was concentrated under reduced pressure to give a predominately aqueous solution. This solution was extracted twice with ethyl acetate (⅓ volume) and the ethyl acetate extracts were combined, dried with sodium sulphate and filtered. The filtrate obtained was concentrated under reduced pressure to yield a gum (1.5 g.) which was then combined with the ethyl acetate extract from the culture filtrate to give a total extract weight of 9.7 g.

The oily residue (30 g.), obtained as described above from three such 30 l. fermentations, was dissolved in the minimum volume of petroleum ether (b.p. 60°-80° C.) and the solution was applied to the top of a column of neutral alumina (45 cm×4¼ cm, Woelm, 500 g.) made up as a slurry with the same solvent. The column was first eluted with 2 l. petroleum ether (b.p. 60°-80° C.), followed by 2 l. of a mixture of 10% v/v ethyl acetate in petroleum ether (b.p. 60°-80° C.) which brought off substantial amounts of oily components which were discarded. The eluent mixture was then changed to 30% v/v ethyl acetate in petroleum ether (b.p. 60°-80° C.) and 25 ml. fractions of eluent were collected on an automatic fraction collector. Factors B and C were eluted as a mixture in tubes 60 to 80, the contents of which were pooled and concentrated to give a syrup (730 mg.). This syrup also contained small quantities of aplasmomycin (Factor A) but the bulk of this compound was located in tubes 81-120. The $R_F$ of Factors A, B and C on thin layer chromatography on Merck's 60F-254, 0.25 mm. silica gel plates developed with 50% v/v ethyl acetate in petroleum ether (b.p. 60°-80° C.) are approximately as follows:

|  |  | $R_F$ |
| --- | --- | --- |
| Factor A | (Aplasmomycin) | 0.36 |
| Factor B |  | 0.25 |
| Factor C |  | 0.21 |

The factors are visualised as brown spots after spraying with 3 N sulphuric acid and heating at 100° C.

The syrup (60 mg.) containing predominantly Factors B and C was further purified by preparative layer chromatography on silica (Merck's "Keiselgel 60 F250"—trade mark—2 mm. thick) using 50% v/v ethyl acetate in petroleum ether (b.p. 60°-80° C.) as the eluent mixture. The band at $R_F$ 0.25 (approx.) was scraped from the plate and extracted with ethyl acetate, and the solvent was evaporated to give Factor B as a white crystalline solid (20 mg.), which was crystallised from aqueous methanol and dried under vacuum, m.p. 260°-2° C.; I.R. 3360, 1735, 1710, 1285, 1080 cm$^{-1}$ (Nujol mull). Analysis: Found C=58.3, H=7.4. Calculated for $C_{42}H_{62}B$ $NaO_{15}.H_2O$, C=58.7, H=7.4. Mass spectrum—M$^+$=840.403, calculated for $C_{42}H_{62}B$ $NaO_{15}$=840.408. The n.m.r. spectrum (in CDCl$_3$) shows a prominent peak at δ 2.1, due probably to one acetyl group.

The band at $R_F$=0.2 (approx.) was also scraped from the plate and extracted with ethyl acetate, and the solvent was evaporated to give Factor C as a white crystalline solid (6 mg.). M.p.>320° C.I.R. 1735, 1715, 1285, 1265 cm$^{-1}$ (Nujol mull). Mass spectrum—M$^+$=882.418, calculated for $C_{44}H_{64}B$ $NaO_{16}$=822.419.

EXAMPLE 4

The test process described in Example 2 was repeated, comparing aplasmomycin with Factor B and C. The following results were obtained, expressed as percentages of the values obtained in untreated controls:

|  |  | % inhibition of methane | Ac/Pr | Ac/Bu |
| --- | --- | --- | --- | --- |
| Aplasmomycin | 3ppm | 69 | −40 | −49 |
| Factor B | 3ppm | 76 | −45 | −18 |
| Factor C | 3ppm | 44 | −41 | +22 |
| Aplasmomycin | 1ppm | 57 | −41 | −36 |
| Factor B | 1ppm | 63 | −48 | +21 |
| Factor C | 1ppm | 15 | −33 | +18 |

EXAMPLE 5

The short term effects of ICI.122,378 and Factor B on the rumen metabolism of sheep was demonstrated as follows:

The rumen fermentation patterns of a group of sheep were stabilised by feeding them a standard diet of dried grass (2×500 g. per day) for some months. Six test animals were used for each inclusion level of each test compound. Groups of animals were also given monensin, a known modifier of rumen metabolism, as a positive control, and twelve untreated animals were used as a negative control. Samples of rumen fluid were collected by stomach tube from each animal 6 hours after treatment, and analysed by gas-chromatography for acetate, propionate and butyrate. The following results were obtained:

| Treatment | Dose Level (mg/kg) | Molar % rumen V.F.A. | | |
|---|---|---|---|---|
| | | Acetate | Propionate | Butyrate |
| Day 4 | | | | |
| Control | 0 | 64.5 | 24.0 | 10.2 |
| Monensin | 0.5 | 59.8 | 27.8 | 11.3 |
| | 0.25 | 60.5 | 28.5 | 9.9 |
| ICI.122,378 | 0.5 | 63.4 | 25.5 | 9.9 |
| | 0.25 | 63.7 | 25.1 | 9.8 |
| Factor B | 0.5 | 65.0 | 22.4 | 11.3 |
| | 0.25 | 65.1 | 22.3 | 11.3 |
| Day 7 | | | | |
| Control | 0 | 65.6 | 22.9 | 10.7 |
| Monensin | 0.5 | 60.2 | 26.2 | 12.6 |
| | 0.25 | 61.3 | 26.1 | 11.4 |
| ICI.122,378 | 0.5 | 62.6 | 26.6 | 9.2 |
| | 0.25 | 63.8 | 24.8 | 9.9 |
| Factor B | 0.5 | 63.5 | 25.9 | 8.9 |
| | 0.25 | 63.5 | 22.1 | 11.7 |

What we claim is:

1. A method, for use in the husbandry of domesticated ruminant animals to improve their rate of growth or efficiency of their food conversion, which comprises orally administering to such animals an effective amount of a compound of the formula:

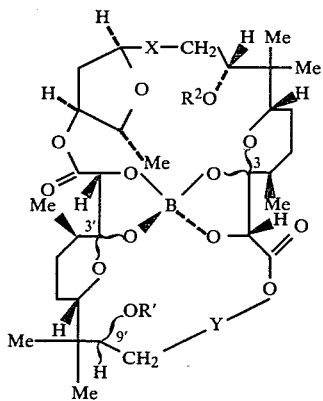

wherein
$R^1$ and $R^2$ are each a hydrogen atom or an acetyl radical,
and either carbon atoms 3, 3' and 9' are all in the R-configuration, X is an ethylene or trans-vinylene radical and Y is a radical $Y^1$ of the formula:

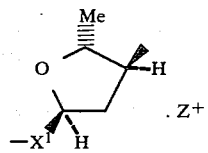

in which $X^1$ is bonded to the $CH_2$ group and the ring carbon atom is bonded to the oxygen atom, and in which $X^1$ is an ethylene or trans-vinylene radical, and $Z^+$ is a sodium, potassium, lithium, caesium or ammonium ion, or an ion of the formula $R^3R^4R^5R^6N^+$ in which each of $R^3$, $R^4$, $R^5$ and $R^6$ is hydrogen or 1–6 C alkyl;

or carbon atoms 3, 3' and 9' are all in the S-configuration, X is an ethylene radical and Y is a radical $Y^2$ of the formula:

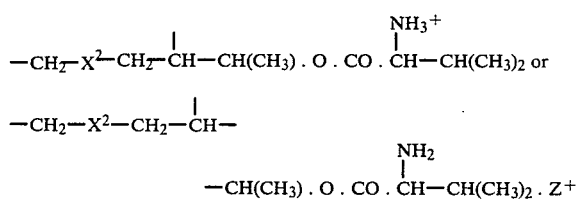

in which the $CH_2$ is bonded to the $CH_2$ group shown in formula I, and the CH group is bonded to the oxygen atom, and in which $X^2$ is an ethylene or cis-vinylene radical;

or carbon atoms 3,3' and 9' are all in the S-configuration, X is an ethylene radical and Y is a radical $Y^3$ of the formula:

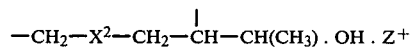

wherein $X^2$ and $Z^+$ have the meanings stated above.

2. A method as claimed in claim 1 wherein the compound of the formula I is aplasmomycin.

3. A method as claimed in claim 1 wherein the compound of the formula I is Factor B, a compound of the molecular formula $C_{42}H_{62}BNaO_{15}$ which is a cometabolite of aplasmomycin in the fermentation of *Streptomyces griseus* NCIB 11371, and is a monoacetyl derivative thereof.

4. A method as claimed in claim 1 wherein the compound of the formula I is boromycin, or Factor C, a compound of the formula $C_{44}H_{64}BNaO_{15}$ which is a co-metabolite of aplasmomycin in the fermentation of *Streptomyces griseus* NCIB 11371, and is a diacetyl derivative thereof.

5. A method as claimed in claim 1 wherein the compound of the formula I is administered to animals in admixture with an ordinary solid foodstuff, in feedblocks or salt-licks, dissolved or suspended in the drinking water or, for young animals, dissolved or suspended in whole milk or skim milk, or in the form of a slow-release, intra-ruminal pellet or bolus.

6. A method as claimed in claim 5 wherein each treated animal will ingest between 0.01 mg/kg. body weight per day, and 30 mg./kg. body weight per day of a compound of the formula I.

* * * * *